United States Patent
Guillot et al.

(10) Patent No.: US 12,405,487 B2
(45) Date of Patent: Sep. 2, 2025

(54) OPTICAL SYSTEM

(71) Applicant: Essilor International, Charenton-le-Pont (FR)

(72) Inventors: Matthieu Guillot, Charenton-le-Pont (FR); Bruno Fermigier, Charenton-le-Pont (FR); Marius Peloux, Charenton-le-Pont (FR); Gilles Le Saux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 876 days.

(21) Appl. No.: 17/624,507

(22) PCT Filed: Jul. 3, 2020

(86) PCT No.: PCT/EP2020/068783
§ 371 (c)(1),
(2) Date: Jan. 3, 2022

(87) PCT Pub. No.: WO2021/001524
PCT Pub. Date: Jan. 7, 2021

(65) Prior Publication Data
US 2022/0357595 A1    Nov. 10, 2022

(30) Foreign Application Priority Data

Jul. 4, 2019   (EP) .................................. 19305913

(51) Int. Cl.
*G02C 7/08*     (2006.01)
*G02C 7/02*     (2006.01)

(52) U.S. Cl.
CPC ............ *G02C 7/086* (2013.01); *G02C 7/022* (2013.01); *G02C 2202/20* (2013.01)

(58) Field of Classification Search
CPC .... G02C 7/086; G02C 7/022; G02C 2202/24; G02C 7/06
See application file for complete search history.

(56) References Cited

U.S. PATENT DOCUMENTS 6,364,483 B1 * 4/2002 Grossinger ............ G02C 7/044
                                                    351/159.41
9,753,193 B2 * 9/2017 Tabirian ............... G02B 5/1833
(Continued)

FOREIGN PATENT DOCUMENTS

CN      110221454 A    9/2019
EP      3 112 925 A1   1/2017
(Continued)

OTHER PUBLICATIONS

Office Action issued Dec. 22, 2022, in corresponding European Patent Application No. 19 305 913.6, 6 pages.
(Continued)

*Primary Examiner* — Ricky L Mack
*Assistant Examiner* — Anna Smith
(74) *Attorney, Agent, or Firm* — Oblon, McClelland, Maier & Neustadt, L.L.P.

(57) ABSTRACT

An optical system intended to be worn in front of an eye of a wearer including an optical lens having at least a control point and an optical device that has a plurality of optical elements, the optical device being attached on a surface of the optical lens or encapsulated into the optical lens, wherein each optical element has simultaneously two different optical functions, and the optical device and the optical lens are configured so that the absolute value of the difference between a measured optical power at the control point of the optical system and the optical power corresponding to the prescription for said eye of the person is smaller than or equal to 0.12 diopter.

20 Claims, 5 Drawing Sheets

(56) References Cited

U.S. PATENT DOCUMENTS

| | | | |
|---|---|---|---|
| 2004/0252274 A1* | 12/2004 | Morris | G02C 7/06 |
| | | | 351/159.44 |
| 2006/0073231 A1* | 4/2006 | Joe | B29D 11/00028 |
| | | | 425/808 |
| 2009/0257026 A1 | 10/2009 | Varnas et al. | |
| 2012/0062836 A1 | 3/2012 | Tse et al. | |
| 2013/0070199 A1 | 3/2013 | Blum. et al. | |
| 2014/0347622 A1 | 11/2014 | Wu | |
| 2015/0109574 A1 | 4/2015 | Tse et al. | |
| 2015/0124212 A1 | 5/2015 | Loertscher et al. | |
| 2015/0226983 A1 | 8/2015 | Carmon et al. | |
| 2016/0306192 A1 | 10/2016 | Marshall et al. | |
| 2016/0377884 A1 | 12/2016 | Lau et al. | |
| 2017/0075137 A1 | 3/2017 | Lin et al. | |
| 2017/0131567 A1* | 5/2017 | To | G02C 7/06 |
| 2017/0184875 A1* | 6/2017 | Newman | G02C 7/022 |
| 2017/0219846 A1* | 8/2017 | Ando | A61F 2/1654 |
| 2018/0246354 A1* | 8/2018 | Popovich | G02F 1/1334 |
| 2018/0275427 A1* | 9/2018 | Lau | G02C 7/081 |
| 2019/0064542 A1* | 2/2019 | Chen | G02C 7/041 |
| 2019/0196224 A1* | 6/2019 | Hsiao | G02B 27/0025 |
| 2019/0212580 A1 | 7/2019 | To et al. | |
| 2019/0324293 A1 | 10/2019 | Marshall et al. | |
| 2020/0012123 A1 | 1/2020 | Newman | |
| 2020/0159044 A1 | 5/2020 | To et al. | |

FOREIGN PATENT DOCUMENTS

| | | |
|---|---|---|
| JP | 2009-511962 A | 3/2009 |
| JP | 2010-520514 A | 6/2010 |
| JP | 2017-58668 A | 3/2017 |
| WO | WO 2015/147758 A1 | 10/2015 |
| WO | WO 2016/168746 A1 | 10/2016 |
| WO | WO 2018/076057 A1 | 5/2018 |
| WO | WO 2019/206569 A1 | 10/2019 |

OTHER PUBLICATIONS

International Search Report and Written Opinion issued Sep. 1, 2020 in PCT/EP2020/068783 filed Jul. 3, 2020, 15 pages.

Office Action issued Jul. 18, 2023, in corresponding Japanese Patent Application No. 2022-500095 (with English Translation), 18 pages.

* cited by examiner

OPTICAL SYSTEM

TECHNICAL FIELD

The invention relates to an optical system intended to be worn in front of an eye of a person to suppress progression of abnormal refractions of the eye such as myopia or hyperopia and to an optical device intended to be placed on a surface, or inside, of an optical lens in order to add an optical power to said optical lens.

BACKGROUND OF THE INVENTION

Myopia of an eye is characterized by the fact that the eye focuses distant objects in front of its retina, hyperopia by the fact that the eye focuses distant objects behind of its retina. Myopia is usually corrected using a concave lens and hyperopia is usually corrected using a convex lens.

It has been observed that some individuals when corrected using conventional single vision optical lenses, in particular children, focus inaccurately the image for two main reasons. When they observe an object at distance, even if the image is focused on the central retina, the peripheral image may be focused behind the retina because of the retina curvature. Moreover, with the same lens, when they observe an object which is situated at a short distance away, the image may also be formed behind his retina, even in the foveal area, due to a lag of accommodation.

Such focusing defects may have an impact on the progression of myopia of such individuals. One may observe that for most of said individual the myopia defect tends to increase over time.

Therefore, it appears that there is a need for a lens element that would suppress or at least slow down progression of abnormal refractions of the eye such as myopia or hyperopia.

SUMMARY OF THE INVENTION

To this end, the invention proposes an optical system intended to be worn in front of an eye of a wearer comprising:
  an optical lens having at least a control point, and
  an optical device comprises a plurality of optical elements, the optical device being attached on a surface of the optical lens or encapsulated into the optical lens,
wherein
  each optical element has simultaneously two different optical functions, and
  the optical device and the optical lens are configured so that the absolute value of the difference between a measured optical power at a point, for example at the control point of the optical system and the optical power corresponding to the prescription for said eye of the person is smaller than or equal to 0.12 diopter.

Advantageously, having an optical device comprising a plurality of optical elements that provide simultaneously two different optical functions, allows having an easy to configure optical system that when worn by the wearer reduces the progression of abnormal refractions of the eye such as myopia or hyperopia by having part of the light focused on the retina of the wearer for the central vision, and part of the light focused either in front or behind the retina of the wearer in the peripheral vision.

According to further embodiments which can be considered alone or in combination:

the optical device is configured so that for at least one optical element the absolute value of the difference between at least one optical power measured through said optical element of said optical system and the optical power measured through the corresponding part of the optical lens alone is smaller than or equal to 0.25 diopter; and/or the first optical function has a mean optical power smaller than or equal to 0.25 diopter and may be for example a spherical or a sphero-torical optical function; and/or the second optical function of at least part of the optical elements has a mean optical power greater than or equal to 0.5 diopter; and/or the second optical function of at least part of the optical elements is so as to not focus an image on the retina of the eye when the optical system is worn in standard wearing conditions so as to slow down the progression of the abnormal refraction of the eye; and/or the second optical function of at least part of the optical element is a non-spherical optical function; and/or the first optical function of at least part of the optical element is so as to focus an image on the retina of the eye when the optical system is worn in standard wearing conditions at least for the central vision; and/or the optical device is attached on the front surface of the optical lens or on the back surface of the optical lens or on a surface comprised between the front and the back surfaces of the optical lens; and/or at least part of the optical elements are contiguous; and/or all the optical elements are contiguous; and/or at least part of, for example all of, the optical elements are arranged along a plurality of concentric rings; and/or at least part, for example all, of the optical elements are made of a birefringent material; and/or at least part, for example all, of the optical elements are diffractive lenses; and/or the diffractive lenses comprise two main diffractive orders, the first main diffractive order providing a first mean optical power smaller in absolute value than or equal to 0.25 diopter, and the second main diffractive order providing a second mean optical power greater than or equal to 0.5 diopter; and/or at least part, for example all, of the optical elements are π-Fresnel lenses; and/or at least part, for example all, of the diffractive lenses comprises a metasurface structure; and/or at least part, for example all, of optical elements are multifocal binary components; and/or at least part, for example all, of the optical elements are pixelated lenses; and/or the optical system has a zone free of optical elements, for example said zone comprises the control point; and/or the optical elements have a squared shape contour or a hexagonal shape contour and are arranged according to a predefined array, for example a square or a hexagonal array; and/or at least part of, for example all of, the optical elements are arranged so as each point of its contour is contiguous to another optical element; and/or at least part of, for example all of, the optical elements are arranged according to a predefined array, for example a square or a hexagonal array; and/or the optical system comprises a prescription portion configured to provide to the wearer in standard wearing conditions a correction optical function based on the prescription of the wearer for correcting an abnormal refraction of said eye of the wearer; and/or the optical lens is an edged optical lens intended to be mounted in a spectacle frame and the whole surface of at least one face of the optical lens is covered with the plurality of optical elements; and/or the optical lens is an edged optical lens intended to be mounted in a spectacle frame and the whole aperture of the optical lens is covered with the plurality of optical elements; and/or the difference between the optical power of the correction optical function and the mean optical power of the second optical function is greater than or equal to 0.5D; and/or each optical element has an optical axis; and/or at least one, for example all, of the optical elements has a shape configured so as to create a caustic in front of the retina of the eye of the person; and/or at least part, for example all, of the optical element have an optical function that comprises high order optical aberrations.

The disclosure further relates to an optical device intended to be placed on a surface of an optical lens in order to add an optical function to said optical lens and for example to form an optical system according to the invention, said optical device comprising a plurality of optical elements, wherein each optical element has simultaneously two different optical functions that provides simultaneously:

a first mean optical power smaller in absolute value than or equal to 0.25 diopter, and a second mean optical power greater than or equal to 0.5 diopter.

According to further embodiments which can be considered alone or in combination:

at least part of the optical elements are contiguous; and/or all the optical elements are contiguous; and/or at least part of, for example all of, the optical elements are arranged along a plurality of concentric rings; and/or at least part, for example all, of the optical elements are made of a birefringent material; and/or at least part, for example all, of the optical elements are diffractive lenses; and/or the diffractive lenses comprise two main diffractive orders, the first main diffractive order providing the first mean optical power smaller in absolute value than or equal to 0.25 diopter, and the second main diffractive order providing the second mean optical power greater than or equal to 0.5 diopter; and/or the second optical function of at least part of the optical element is a non-spherical optical function; and/or at least part, for example all, of the optical elements are π-Fresnel lenses; and/or at least part, for example all, of the diffractive lenses comprises a metasurface structure; and/or at least part, for example all, of optical elements are multifocal binary components; and/or at least part, for example all, of the optical elements are pixelated lenses; and/or the optical device has a zone free of optical elements; and/or at least part of, for example all of, the optical elements have a squared shape contour or an hexagonal shape contour and are arranged according to a predefined array, for example a square or a hexagonal array disposed for example on at least one of the surfaces of the lens element or; and/or at least part of, for example all of, the optical elements are arranged according to a predefined array, for example a square or a hexagonal array to cover the full aperture of the lens element; and/or at least part of, for example all of, the optical elements are arranged according to a predefined array with the optical elements fully contiguous, the optical device is rigid or flexible; and/or the optical device is one of a film, a patch or a wafer; and/or the optical device has a mean radius of curvature of between 88 mm and 53 mm, and preferably equal to 66 mm; and/or the optical device has a mean thickness of between 5 mm and 0.5 mm, measured perpendicularly to at least one face of the device; and/or the optical device comprises a transparent material having a Shore A hardness of between 70 and 95; and/or the optical device comprises a transparent material having a light scattering percentage of between 2.0% and 0.4%, preferably less than 1%; and/or the optical device comprises a transparent thermoplastic material selected from among the polymers polyurethane, polyvinyl chloride, polyethylene terephthalate, poly(methyl methacrylate), and polycarbonate; and/or the optical device comprises a transparent material chosen from among polyurethane thermoplastics and polyvinyl chloride thermoplastic; and/or each optical element has an optical axis; and/or at least one, for example all, of the optical elements has a shape configured so as to create a caustic in front of the retina of the eye of the person; and/or at least part, for example all, of the optical element have an optical function that comprises high order optical aberrations.

The disclosure also relates to a method for providing an optical system intended to be worn in front of an eye of a wearer, wherein the method comprises the steps of:

providing an optical lens configured to provide to the wearer in standard wearing conditions a correction optical power based on the prescription for the wearer for correcting an abnormal refraction of said eye of the wearer, providing an optical device according to the disclosure, forming an optical system by placing the optical device on one surface of the optical lens or by encapsulating the optical device into the optical lens.

The disclosure further relates to a method for providing an optical system intended to be worn in front of an eye of a wearer, wherein the method comprises the step of forming an optical system by encapsulating an optical device according to the disclosure into an optical lens configured to provide to the wearer in standard wearing conditions a correction optical power based on the prescription for the wearer for correcting an abnormal refraction of said eye of the wearer, placing the optical device on one surface of the optical lens.

The disclosure also relates to a method for providing an optical system intended to be worn in front of an eye of a wearer, wherein the method comprises the steps of:

providing a semi-finished optical lens incorporating an optical device according to the disclosure, determining the back surface to be machined on said semi-finished optical so as to match the prescription of the wearer, machining the back surface of the provided semi-finished optical lens so as to obtain the determined back surface.

The invention further relates to a method for providing an optical system intended to be worn in front of an eye of a wearer, wherein the method comprises the step of casting the optical system and during the casting step providing an optical device according to the disclosure.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to an optical system, in particular to an optical system intended to be worn in front of an eye of a person and to an optical device.

In the reminder of the description, terms like «up», «bottom», «horizontal», «vertical», «above», «below», «front», «rear» or other words indicating relative position may be used. These terms are to be understood in the wearing conditions of the optical system.

In the context of the present invention, the term "optical lens" can refer to contact lens, an uncut optical lens or a spectacle optical lens edged to fit a specific spectacle frame or an ophthalmic lens.

In the context of the present invention, the term "optical device" refers to an optical device adapted to be positioned on or inside the optical lens. The optical device may be positioned on the front or back surface of an optical lens or on a surface between the front and back surfaces of an optical lens or inserted in the optical lens. The optical device may be an optical patch or film or wafer.

An optical system 10 according to the disclosure is adapted for a person and intended to be worn in front of an eye of said person.

Figure 1A:
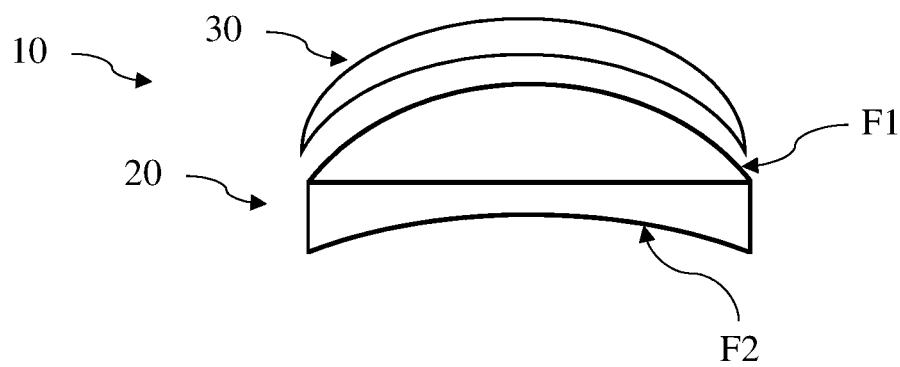
FIG. 1a is a general profile view of an optical system according to the invention.

As illustrated on FIG. 1a, an optical system 10 according to the disclosure may comprise:
an optical lens 20, and
an optical device 30 attached on a surface F1 of the optical lens.

The optical lens 20 comprises at least a control point. For example, the control point may be the geometrical center of the optical lens or the optical center of the optical lens. If the optical lens 20 is a progressive ophthalmic lens, the control point may be the fitting cross, the far vision reference point or the near vision reference point.

In the example represented on FIG. 1a, the optical lens has an object side surface F1, for example formed as a convex curved surface toward an object side, and an eye side surface F2, for example formed as a concave surface having a different curvature than the curvature of the object side surface F1.

According to an embodiment of the invention, the optical device 30 is located on the front surface of the optical lens 20.

Alternatively, the optical device 30 may be located on the back surface of the optical lens.

Alternatively, the optical device may be encapsulated into the optical lens that is located between the front and back surfaces of the optical lens.

Figure 1B:
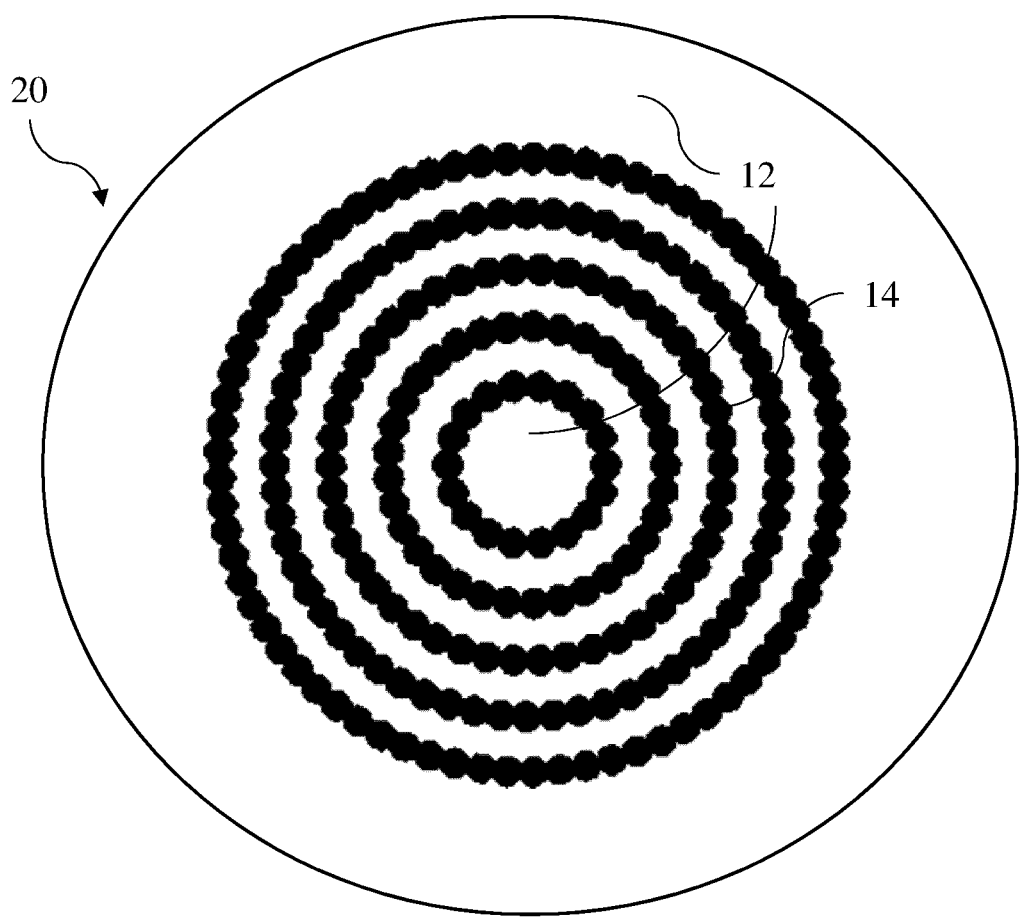
FIG. 1b is a plan view of an optical system according to the invention.

As represented on FIG. 1b, the optical device 20 according to the invention comprises a plurality of optical elements 14.

The plurality of optical elements may be arranged so that the optical system 10 comprises a prescription portion 12 configured to provide to the wearer in standard wearing conditions a correction optical function based on the prescription of the wearer for correcting an abnormal refraction of the eye of the wearer.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example, equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example, equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

The terms "measured optical power" are to be understood as measured with a lensmeter.

The term "prescription" is to be understood to mean a set of optical characteristics of optical power, of astigmatism, of prismatic deviation, of axis determined by an ophthalmologist or optometrist in order to correct the vision defects of the wearer, for example by means of a lens positioned in front of his eye. For example, the prescription for a myopic eye comprises the values of optical power and of astigmatism with an axis determined for the distance vision.

Each optical element 14 of the plurality of optical elements has simultaneously two different optical functions and for example one optical axis.

The optical device and the optical lens may be configured so that the absolute value of the difference between one of the measured optical power at a point, for example at the control point, of the optical system and the optical power corresponding to the prescription for said eye of the person is smaller than or equal to 0.12 diopter, for example smaller than or equal to 0.05 diopters.

The optical device according to the discloses may be configured so that, for at least one optical element, the absolute value of the difference between at least one optical power measured through said optical element of said optical system and the optical power measured through the corresponding part of the optical lens alone is smaller than or equal to 0.25 diopter, for example smaller than or equal to 0.12 diopter.

The optical functions of each optical element 14 may be different one from the others.

The first optical function may be a spherical optical function with an optical power smaller than or equal to 0.25 diopter, for example smaller than or equal to 0.12 diopter or an optical function with a mean optical power smaller than or equal to 0.25 diopter, for example smaller than or equal to 0.12 diopter.

Therefore, each optical element combined with the optical lens may provide two optical powers in standard wearing condition. The optical power corresponding to the first optical function provides an optical power close to the prescribed optical power, i.e. with a difference smaller than or equal to 0.25 diopter.

The first optical function of at least part of the optical element may be so as to focus an image on the central retina of the eye when the optical system is worn in standard wearing conditions, whatever the eye gaze direction.

The second optical function of at least part of the optical elements may have a mean optical power greater than or equal to 0.5 diopter, for example greater than 1 diopter.

The second optical function of at least part of the optical elements may be of not focusing an image on the retina of the eye in said standard wearing conditions so as to slow down the progression of the abnormal refraction of the eye.

The second optical function of at least part of the optical element may be a non-spherical optical function.

The two optical functions differ at least in that their optical power are different one from the other. In the sense of the invention two optical powers are different if the absolute value of the difference between these two powers is greater than or equal to 0.25 diopter.

The optical elements comprised on the optical device may be contiguous.

In the context of the present disclosure, two optical elements are to be considered contiguous if there is a path linking the two optical elements all along which one may measure in standard wearing conditions at least one optical power different from the optical power based on the prescription of the wearer for correcting an abnormal refraction of the eye of the wearer.

In the context of the present disclosure, all the optical elements are contiguous is to be understood as an optical system on which the two optical functions of the optical elements may be measured at all points of the optical system.

For an optical system or device where all optical elements are identical and reproduced periodically, for each of these optical elements it is possible to determine a contour and consequently a "center" of this optical element (optical center or geometric center, e.g. a centroid). The optical elements are to be considered "contiguous" if the distance between the centers (C1, C2) of these optical elements is smaller than the dimension of the optical element in the direction C1C2.

Each optical element of the plurality of optical elements is transparent on the whole visible spectrum.

At least part, for example all, of the center of the optical elements may be disposed on a pre-defined array of points, e.g. an array of points comprising points arranged in a squared shape or hexagonal shaped or an array comprising randomly located dots.

Advantageously, the inventors have observed that for a given density of optical element, having at least part of, for example all of, the optical elements arranged along a plurality of concentric rings increases the overall acuity of the lens element. For example, having the distance D between two adjacent concentric rings of optical elements greater than 2.00 mm allows managing a larger area between these rings of optical elements and thus provides better overall visual acuity The optical elements may cover specific zones of the optical system, like at the center or any other area of the optical lens, for example the periphery.

According to an embodiment, the optical device may have a zone free of optical elements, for example said zone comprises the control point.

For example, a disk centered on the fitting cross and having a radius greater than 1.5 mm, for example greater than 2 mm, and smaller than 5 mm may be free of optical elements.

Different parts of the lens element may be free of optical elements depending on design requirements.

According to a preferred embodiment of the disclosure, the optical lens is an edged optical lens intended to be mounted in a spectacle frame and the whole surface of at least one face of the optical lens is covered with the plurality of optical elements.

Figure 2:
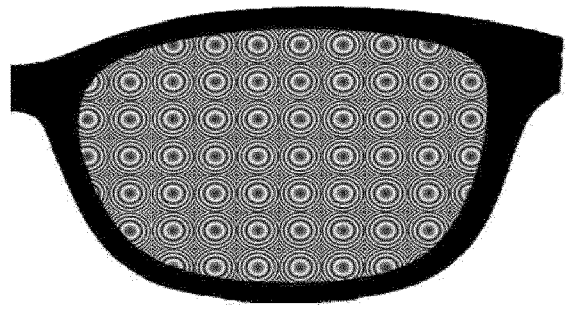
FIG. 2 represents an example of an optical system covered by plurality of contiguous Fresnel type optical elements.

An example of such embodiment is illustrated on FIG. 2, where a face of the lens element is fully covered with a plurality of contiguous diffractive type optical elements.

The optical element density or the quantity of power may be adjusted depending on zones of the optical device. Typically, the optical element may be positioned in the periphery of the optical device, in order to increase the effect of the optical element on myopia control, so as to compensate peripheral defocus due to the peripheral shape of the retina for example.

The optical elements can be made using different technologies like direct surfacing, molding, casting or injection, embossing, filming, or photolithography etc. . . . According to the invention photolithography may be particularly advantageous in particular if one of the surfaces of the optical device is plane, or to manufacture a master from which films or wafers can be replicated.

According to an embodiment of the invention, at least one, for example all, of the optical elements has a shape configured so as to create a caustic in front of the retina of the eye of the person. In other words, such optical element is configured so that every section plane where the light flux is concentrated if any, is located in front of the retina of the eye of the person.

According to an embodiment of the invention, at least one, for example all, of the optical elements, is made of a different material than the optical lens. In particular the refractive index of the optical elements may be different from the refractive index of the material of the optical device.

According to an embodiment of the invention, at least one, for example all, of the optical elements, is made of a birefringent material. In other words, the optical element is made of a material having a refractive index that depends on the polarization and propagation direction of light. The birefringence may be quantified as the maximum difference between refractive indices exhibited by the material.

According to an embodiment of the invention, at least part, for example all, of the optical elements are diffractive lenses within the visible spectrum, for example for wavelengths from 400 nm to 700 nm.

For example, at least part, for example all, of the optical elements are pixelated optical elements, such as pixelated lenses, into which one pixel in two is associated to one of each optical function. Examples of pixelated lenses are disclosed in Eyal Ben-Eliezer, Emanuel Marom, Naim Konforti, and Zeev Zalevsky. Experimental realization of an imaging system with an extended depth of field. Appl. Opt., 44(14):2792-2798, May 2005.

According to an embodiment of the invention, at least one, for example all of the optical elements, has discontinuities, such as a discontinuous surface, for example Fresnel surfaces and/or having a refractive index profile with discontinuities.

Figure 3:
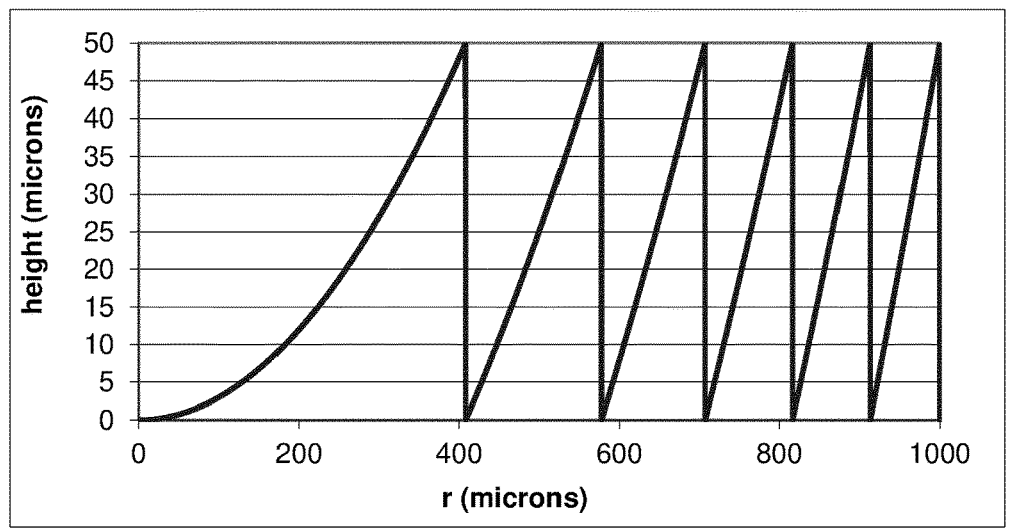
FIG. 3 represents an example of a first diffractive lens radial profile.

FIG. 3 represents an example of a first diffractive lens radial profile of a optical element that may be used for the invention.

Figure 4:
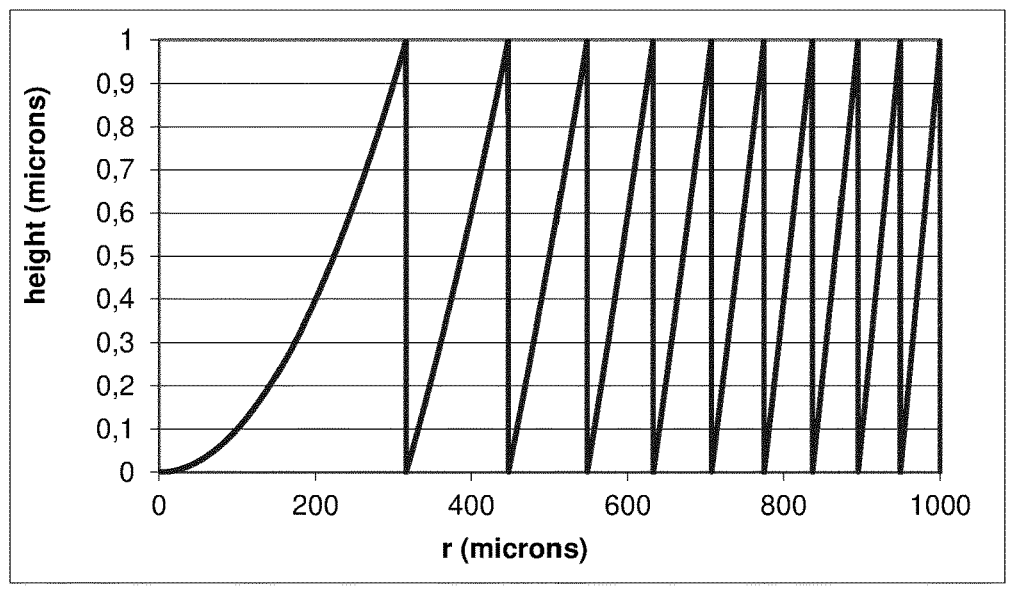
FIG. 4 represents an example of a second diffractive lens radial profile.

FIG. 4 represents an example of a second diffractive lens radial profile of a optical element that may be used for the invention.

Figure 5:
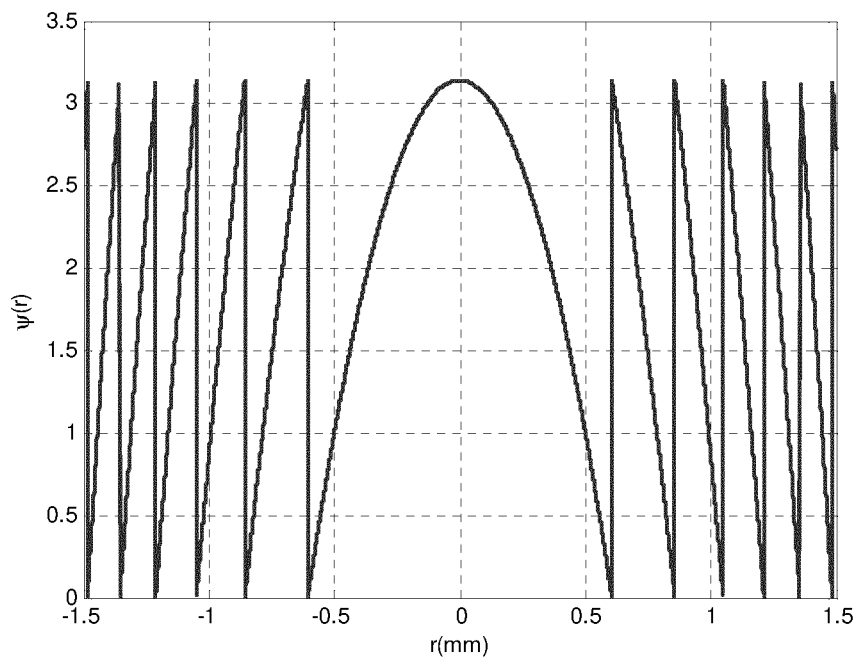
FIG. 5 illustrates a π-Fresnel lens radial profile.

The diffractive lens may be a diffractive lens whose phase function $\psi(r)$ has $\pi$ phase jumps at the nominal wavelength $\lambda_0$, as seen in FIG. 5. One may give these structures the name "$\pi$-Fresnel lenses" for clarity's sake, as opposition to unifocal Fresnel lenses whose phase jumps are multiple values of $2\pi$. The $\pi$-Fresnel lens whose phase function is displayed in FIG. 5 diffracts light mainly in two diffraction orders (order 0 and +1) associated to dioptric powers $P(\lambda_0)$ =0$\delta$ and a positive one, for example $P(\lambda_0)$=3$\delta$, with $\lambda_0$=550 nm.

An advantage of this design is that the diffraction order dedicated to the prescription of the wearer is not chromatic whereas the one used to provide the second optical function to slow down myopia progression is very chromatic. Advantageously, allowing increasing wearer comfort.

A typical size for the optical element may be greater than or equal to 500 µm preferably greater than or equal 2 mm and smaller than or equal to 5 mm preferably smaller than or equal to 2.5 mm. Indeed, the inventors have observed that maintaining an optical element size smaller than the wearer eye pupil size is advantageous.

For example, the diffraction efficiency of the 0 and +1 orders is of about 40% at the nominal wavelength $\lambda_0$.

To increase the efficiency of the diffraction order corresponding to the wearer prescription one may consider the following.

Figure 6A:
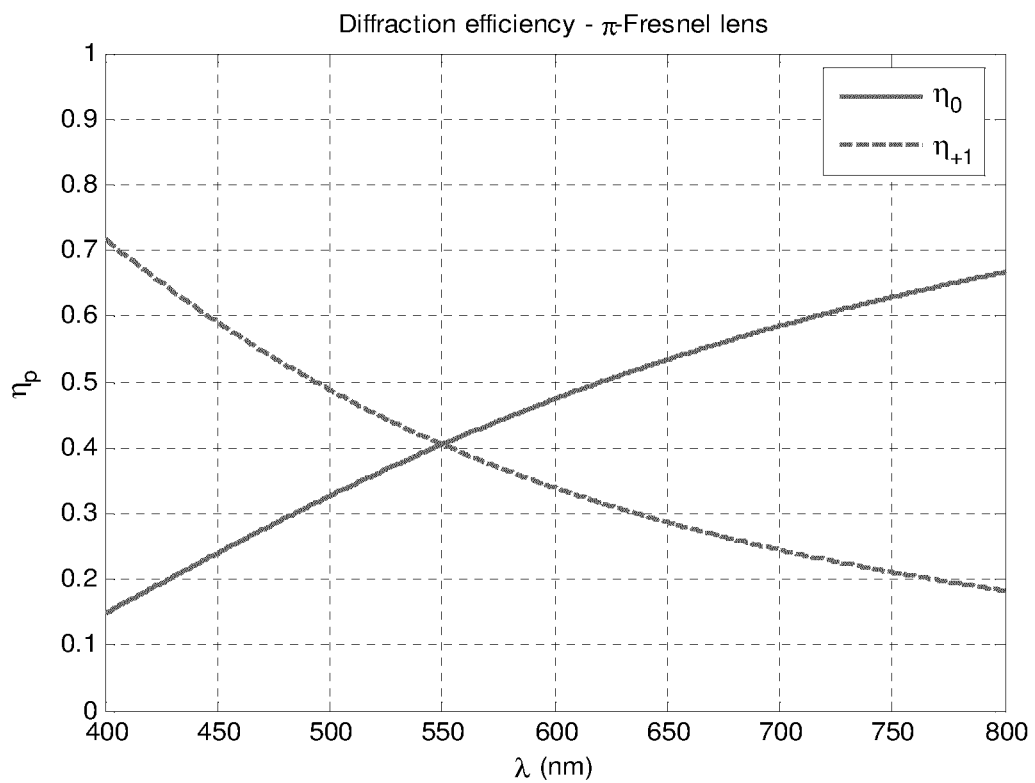
FIGS. 6a and 6b illustrates diffraction efficiencies of a π-Fresnel lens profile as a function of the wavelength and FIGS. 7a to 7c illustrate a binary lens embodiment of the invention.
Figure 6B:
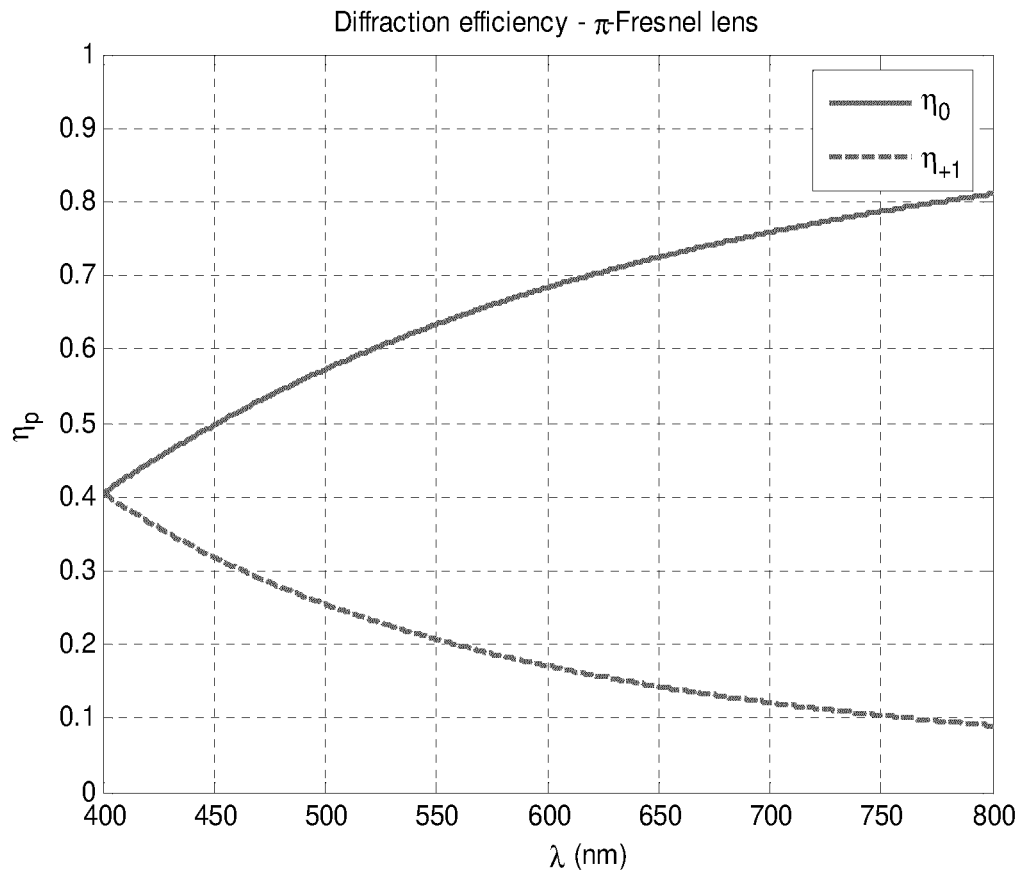

To increase the efficiency of the diffraction order 0 one may decrease the value of $\lambda_0$. FIG. 6a shows the diffraction efficiencies with $\lambda_0$=550 nm and FIG. 6b shows the diffraction efficiencies if $\lambda_0$=400 nm. One can notice that in this case, the diffraction efficiency of order 0 is generally higher, whereas the efficiency of order +1 is lower, on the whole visible spectrum. In this case the dioptric power of the refractive phase function to which we apply the phase jumps should be equal to 1.5*400/550≈1.1$\delta$ for $\lambda_0$=550 nm instead of 1.5$\delta$ in FIG. 5, so that order +1 corresponds to a dioptric power of 3$\delta$ at $\lambda_0$=550 nm. This results in a widening of the rings of FIG. 5.

One may in addition or alternatively set to zero one ring out of two of the configurations illustrated on FIG. 5. In this case, the simultaneously two different functions still exists due to the remaining $\pi$-Fresnel rings, while the rings set to 0 induce a more important proportion of 0$\delta$ dioptric power.

One may further consider applying $\pi$-Fresnel structures made of two materials with two different refraction indices and different Abbe numbers to obtain the phase function of FIG. 5 at $\lambda$=$\lambda_0$ and to get more homogeneous efficiencies on the visible spectrum and/or to privilege one of the two main diffraction orders in relation to the other.

Other combinations with superimposed $\pi$-Fresnel structures could be considered.

According to an embodiment of the disclosure, at least one, for example all of the optical elements, is a multifocal binary component, for example multifocal binary lenses. The binary lens may have a radial profile with a discontinuity height of about 1 µm.

Figure 7A:
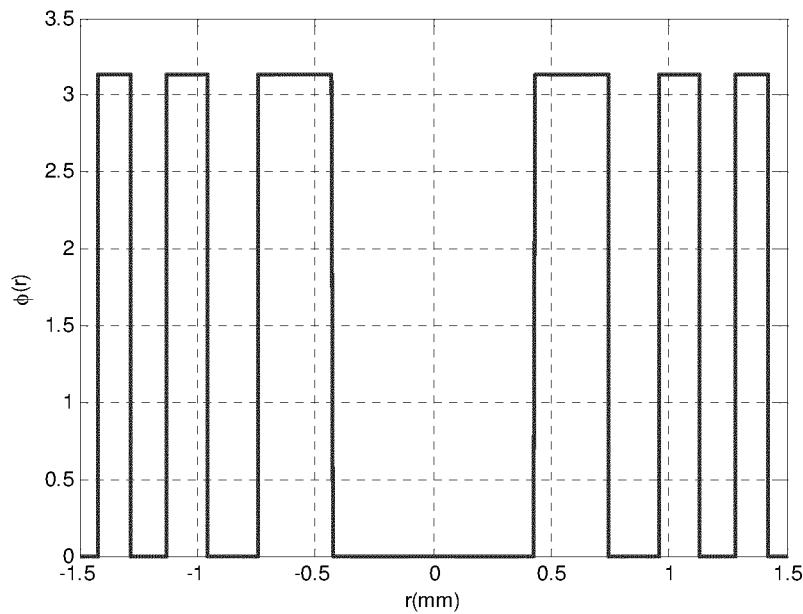
Figure 7B:
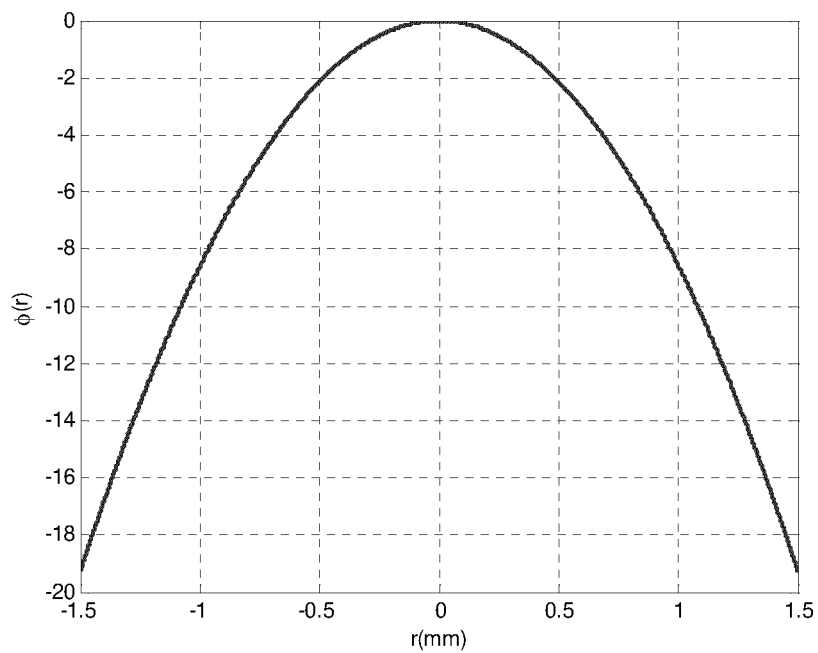
Figure 7C:
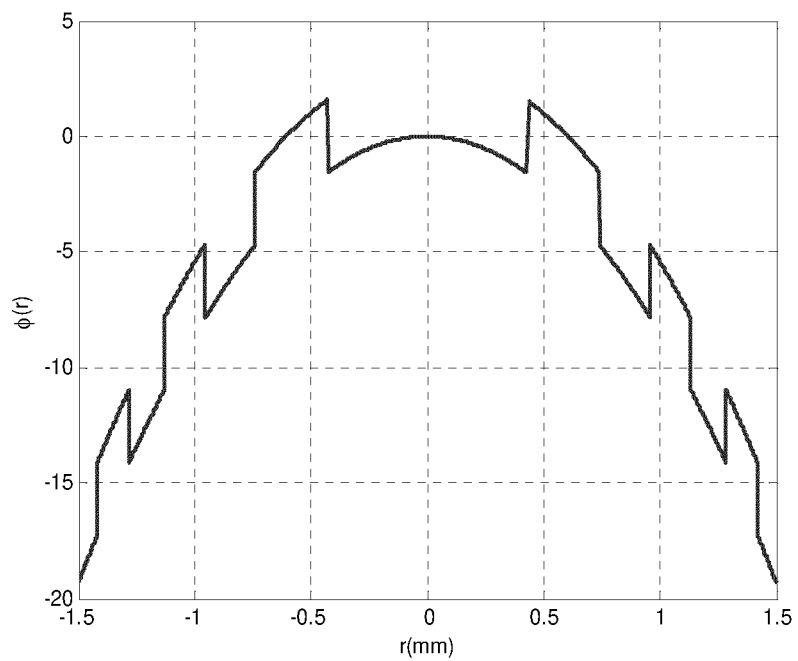

For example, a binary structure, as represented in FIG. 7a, displays mainly two dioptric powers, denoted −P/2 and P/2 and corresponding to two main diffraction orders. When associated to a refractive structure as shown in FIG. 7b, whose dioptric power is P/2, the final structure represented in FIG. 7c has dioptric powers 0$\delta$ and P. The illustrated case is associated to P=3$\delta$.

Advantageously the diffraction efficiency of the −1 and 1 orders is of about 40% at the nominal wavelength, in addition the diffraction efficiency stays high all over the visible spectrum, typically over 35%.

According to an embodiment of the disclosure, at least part, for example all, of the diffractive lenses comprises a metasurface structure also referred to as metalens.

For example, the lens element may comprise an array of simultaneously bifocal metalenses of dioptric power P1, P2 with P1=0$\delta$ and with a controlled chromatism.

Typically, P1=0$\delta$ can be achromatic, meaning having the same focal for each wavelength or partially achromatic.

The chromatism of P2 can be advantageously controlled, for example focal length and efficiency depending on the wavelengths.

The chromatism of each metalens can be different as a function of the position of the metalens on the surface of the lens element, near, intermediate or far vision zone.

Each metalens itself can be made of an array of subwavelength elements:

For example, the sub-wavelength elements can have any shape such as circular, rectangular or elliptical, any dimension, can be equidistant, aligned all in the same direction or in rotation with one another.

The sub-wavelength elements of the metalens should be made of high dielectric material.

Each metalens can be made of a combination of "sub-metalenses". For example, the bifocal properties can be obtained as a function of the wavelength by spatial multiplexing or stack of several sub-metalenses.

The bifocal properties can be obtained as a function of the polarization by spatial multiplexing or stack of several sub-metalenses.

According to an embodiment of the disclosure, at least one, for example all of the optical elements, has an optical function with high order optical aberrations. For example, the optical element is a micro-lens composed of continuous surface defined by Zernike polynomials.

The invention also relates to an optical device intended to be placed on a surface of an optical lens in order to add an optical power of said optical lens, for example to form an optical system as disclosed here, said optical device comprising a plurality of optical elements, wherein each optical element has simultaneously two different optical functions that provides simultaneously:
- a first optical power smaller in absolute value than or equal to 0.25 diopter, and
- a second mean optical power greater than or equal to 0.5 diopter.

The optical elements of the optical device may comprise any combination of features described previously in relating the optical system.

Depending on the embodiment, the optical device may be rigid or flexible. As disclosed previously the optical device may be one of a film, a path or a wafer.

The optical device may be attached to a surface of an optical lens, by means of the intrinsic adhesive properties of the material that make up said optical device, or possibly by the use of a thin film of water between the two interfaces which acts as a vector to initiate the contact between the optical device and the optical lens.

Thus, in the disclosure, the material that makes up the optical device preferably combines properties of transparency to enable it to retain the optical quality of the optical lens that is to receive it, as well as tackiness properties, and physical properties which give it a certain flexibility in order for it to fit to the radius of curvature of the optical component to which it will be attached.

Advantageously, the material that makes up the optical device of the disclosure has a Shore A hardness of between 70 and 95, and a light scattering percentage of between 2.0% and 0.4%, preferably less than 1%.

Materials that may be used in the context of the disclosure can be, in particular, transparent thermoplastic materials selected for example from among the polymers polyurethane, polyvinyl chloride, polyethylene terephthalate, poly (methyl methacrylate), and polycarbonate. Preferably the material constituting the optical device is chosen from among polyurethane thermoplastics and polyvinyl chloride thermoplastic.

The material of the optical lens may be inorganic or organic. As a non-limiting example, organic material that can be used in the context of the disclosure can be the materials conventionally used in optics and in ophthalmology. For example, appropriate materials are substrates such as polycarbonate; polyamide; polyimide; polysulfone; poly (ethylene terephthalate) and polycarbonate copolymers; polyolefins, particularly polynorbornenes; diethylene glycol bis(allyl carbonate) polymers and copolymers; (meth)acrylate polymers and copolymers, particularly polymers and copolymers of (meth)acrylate derivatives of bisphenol-A; thio(meth)acrylate polymers and copolymers; urethane and thiourethane polymers and copolymers; epoxy polymers and copolymers and episulfide polymers and copolymers.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. An optical system intended to be worn in front of an eye of a wearer comprising:
   an optical lens having at least a control point; and
   an optical device having a plurality of optical elements, the optical device being attached on a surface of the optical lens or encapsulated into the optical lens,
   wherein each optical element simultaneously has two different optical functions including a first optical function and a second optical function,
   wherein the first optical function of at least part of the optical element is to focus an image on a retina of the eye when the optical system is worn in standard wearing conditions, whatever an eye gaze direction,
   wherein the second optical function of at least part of the optical elements is to not focus an image on the retina of the eye in said standard wearing conditions and instead to be focused either in front or behind the retina of the wearer in peripheral vision, and
   wherein the optical device and the optical lens are configured so that an absolute value of a difference between a measured optical power at the control point of the optical system and a second optical power corresponding to a prescription for said eye of the wearer is smaller than or equal to 0.12 diopter.

2. The optical system according to claim 1, wherein, for at least one optical element, an absolute value of a difference between at least one third optical power measured through said optical element of said optical system and a fourth optical power measured through a corresponding part of the optical lens alone is smaller than or equal to 0.25 diopter.

3. The optical system according to claim 2, wherein the first optical function is an optical function with a mean optical power smaller than or equal to 0.25 diopter.

4. The optical system according to claim 2, wherein the second optical function of at least part of optical elements has a mean optical power greater than or equal to 0.5 diopter.

5. The optical system according to claim 2, wherein the second optical function of at least part of optical elements is to not focus an image on a retina of the eye when the optical system is worn in standard wearing conditions to slow down progression of abnormal refraction of the eye.

6. The optical system according to claim 1, wherein the first optical function is an optical function with a mean optical power smaller than or equal to 0.25 diopter.

7. The optical system according to claim 6, wherein the second optical function of at least part of optical elements has the mean optical power greater than or equal to 0.5 diopter.

8. The optical system according to claim 6, wherein the second optical function of at least part of the optical elements is to not focus an image on a retina of the eye when the optical system is worn in standard wearing conditions to slow down progression of abnormal refraction of the eye.

9. The optical system according to claim 1, wherein the second optical function of at least part of the optical elements has a mean optical power greater than or equal to 0.5 diopter.

10. The optical system according to claim 1, wherein the second optical function of at least part of the optical elements is to not focus an image on a retina of the eye when the optical system is worn in standard wearing conditions to slow down progression of abnormal refraction of the eye.

11. The optical system according to claim 1, wherein the optical device is attached on a front surface of the optical lens or on a back surface of the optical lens or is inserted inside the optical lens.

12. The optical system according to claim 1, wherein at least part of the optical elements are contiguous.

13. The optical system according to claim 1, wherein at least part of the optical elements are arranged along a plurality of concentric rings.

14. The optical system according to claim 1, wherein at least part of the optical elements are diffractive lenses.

15. The optical system according to claim 14, wherein the diffractive lenses comprise two main diffractive orders, a first main diffractive order providing a first mean optical power smaller in absolute value than or equal to 0.25 diopter, and a second main diffractive order providing a second mean optical power greater than or equal to 0.5 diopter.

16. The optical system according to claim 1, wherein at least part of the optical elements are π-Fresnel lenses.

17. The optical system according to claim 1, wherein the optical elements have a squared shape contour or a hexagonal shape contour and are arranged according to a predefined array including one of a square and a hexagonal array.

18. An optical device intended to be placed on a surface of an optical lens in order to add an optical power of said optical lens, said optical device comprising:
    a plurality of optical elements, wherein each optical element has two simultaneously different optical functions that provide simultaneously:
        a first mean optical power smaller in absolute value than or equal to 0.25 diopter, and
        a second mean optical power greater than or equal to 0.5 diopter.

19. A method for providing an optical system intended to be worn in front of an eye of a wearer, comprising:
    providing an optical lens configured to provide to the wearer, in standard wearing conditions, a correction optical power based on a prescription for the wearer for correcting an abnormal refraction of said eye of the wearer,
    providing an optical device intended to be placed on a surface of the optical lens in order to add an optical power of said optical lens, said optical device including a plurality of optical elements, wherein each optical element has two simultaneously different optical functions including a first optical function and a second optical function that provide simultaneously a first mean optical power smaller in absolute value than or equal to 0.25 diopter and a second mean optical power greater than or equal to 0.5 diopter, and
    forming the optical system by placing the optical device on one surface of the optical lens or by encapsulating the optical device into the optical lens,
    wherein the first optical function of at least part of the optical element is to focus an image on a retina of the eye when the optical system is worn in standard wearing conditions, whatever an eye gaze direction, and
    wherein the second optical function of at least part of the optical elements is to not focus an image on the retina of the eye in said standard wearing conditions and instead to be focused either in front or behind the retina of the wearer in peripheral vision.

20. The method according to claim 19, wherein the method further comprises casting the optical system to generate a casted lens and during the casting providing the optical device to be inserted in the casted lens.

* * * * *